(12) United States Patent
Mohammadnezhad et al.

(10) Patent No.: US 11,394,597 B2
(45) Date of Patent: Jul. 19, 2022

(54) TRANSMITTER ARCHITECTURE FOR GENERATING $4^N$-QAM CONSTELLATION WITH NO DIGITAL-TO-ANALOG CONVERTERS (DAC) IN SIGNAL PATH REQUIREMENT

(71) Applicant: THE REGENTS OF THE UNIVERSITY OF CALIFORNIA, Oakland, CA (US)

(72) Inventors: Seyed Mohammad Hossein Mohammadnezhad, Irvine, CA (US); Huan Wang, Irvine, CA (US); Payam Heydari, Irvine, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 0 days.

(21) Appl. No.: 17/162,200

(22) Filed: Jan. 29, 2021

(65) Prior Publication Data
US 2021/0218614 A1 Jul. 15, 2021

Related U.S. Application Data

(63) Continuation of application No. PCT/US2019/044208, filed on Jul. 30, 2019.

(60) Provisional application No. 62/712,062, filed on Jul. 30, 2018.

(51) Int. Cl.
*H04L 27/00* (2006.01)
*H04L 27/36* (2006.01)
*H04B 1/04* (2006.01)

(52) U.S. Cl.
CPC ......... *H04L 27/364* (2013.01); *H04B 1/0475* (2013.01); *H04L 27/0008* (2013.01); *H04B 2001/0408* (2013.01)

(58) Field of Classification Search
CPC ... H04L 27/362; H04L 27/0008; H04L 27/36; H04L 27/206; H04L 27/364; H04B 2001/0408; H04B 1/0475
USPC .................. 375/279, 302, 308, 295–298
See application file for complete search history.

(56) References Cited

U.S. PATENT DOCUMENTS

| | | | | |
|---|---|---|---|---|
| 5,463,355 A | * | 10/1995 | Halloran | H04L 27/2071 375/284 |
| 5,815,531 A | | 9/1998 | Dent | |
| 5,867,071 A | * | 2/1999 | Chethik | H03C 3/40 375/264 |
| 5,917,384 A | * | 6/1999 | Chethik | H04L 27/362 332/103 |
| 6,674,811 B1 | * | 1/2004 | Desrosiers | H04L 27/368 332/103 |
| 7,138,882 B2 | * | 11/2006 | Becker | H04L 27/0008 332/103 |

(Continued)

OTHER PUBLICATIONS

WO, PCT/US19/44208 ISR and Written Opinion, dated Oct. 25, 2019.

(Continued)

*Primary Examiner* — Emmanuel Bayard
(74) *Attorney, Agent, or Firm* — One LLP

(57) ABSTRACT

Methods, systems, and apparatuses provide a transmitter architecture that directly generates $4^N$-QAM constellation using a raw bit stream as input and that does not require a digital-to-analog converter (DAC) in the signal path.

18 Claims, 11 Drawing Sheets

(56) References Cited

U.S. PATENT DOCUMENTS

| | | | |
|---|---|---|---|
| 7,315,582 B2* | 1/2008 | Chouly | H04L 27/183 |
| | | | 348/E5.003 |
| 10,097,389 B1* | 10/2018 | Chang | H04L 27/36 |
| 10,284,289 B1* | 5/2019 | Chang | H04B 10/5167 |
| 2006/0147219 A1* | 7/2006 | Yoshino | H04J 14/007 |
| | | | 398/183 |
| 2007/0133918 A1* | 6/2007 | Cho | H04B 10/5057 |
| | | | 385/1 |
| 2007/0171961 A1* | 7/2007 | Farag | H04L 27/206 |
| | | | 375/146 |
| 2008/0048774 A1* | 2/2008 | Chang | H03F 3/72 |
| | | | 330/51 |
| 2010/0202785 A1* | 8/2010 | Kawanishi | H04B 10/505 |
| | | | 398/185 |
| 2013/0216220 A1* | 8/2013 | Yamanaka | H04B 10/548 |
| | | | 398/38 |
| 2013/0322809 A1* | 12/2013 | Goh | H04B 10/5053 |
| | | | 385/3 |
| 2014/0035693 A1* | 2/2014 | Li | H03C 5/00 |
| | | | 332/103 |
| 2014/0037286 A1* | 2/2014 | Krasulick | H04B 10/5561 |
| | | | 398/38 |
| 2018/0254832 A1* | 9/2018 | Onaka | H04B 10/2912 |

OTHER PUBLICATIONS

Erikkson, T. A., et al., "Experimental Demonstration of 128-SP-QAM in Uncompensated Long-Hand Transmission", Optical Fiber Communication Conference and Exposition and the National Fiberoptic Engineers Conference, 2013, pp. 1-3.

* cited by examiner

TRANSMITTER ARCHITECTURE FOR GENERATING $4^N$-QAM CONSTELLATION WITH NO DIGITAL-TO-ANALOG CONVERTERS (DAC) IN SIGNAL PATH REQUIREMENT

CROSS-REFERENCE TO RELATED APPLICATIONS

The present application is a continuation of International Patent Application No. PCT/US19/44208, filed Jul. 30, 2019, which claims priority to U.S. Provisional Application No. 62/712,062, titled "TRANSMITTER ARCHITECTURE FOR GENERATING $4^N$-QAM CONSTELLATION WITH NO DIGITAL-TO-ANALOG CONVERTERS (DAC) IN SIGNAL PATH REQUIREMENT," filed Jul. 30, 2018, the contents of both of which are incorporated herein by reference in their entireties.

FIELD

The present disclosure relates generally to transmitters for wireless communication, and, more particularly to a transmitter architecture that directly generates $4^N$-QAM (quadrature amplitude modulation) constellation using a raw bit stream as input and that does not require a digital-to-analog converter (DAC) in the signal path.

BACKGROUND

The continued super-linear growth of the world's population, coupled with worldwide access to Internet and the general public's tendency to use more bandwidth-intensive applications, fuels an urgency to enhance wireless and wired infrastructure so as to meet the drastically increasing demand of communication speed. The very first implication of this notion is that the currently used wireless spectra from low-RF (e.g., 400 MHz) to around 10 GHz is too crowded to accommodate any grandiose enhancement in wireless data rates.

There has been a significant amount of interest in tapping into vastly under-utilized spectrum at mm-wave and even THz frequency range. Moreover, the possibility of replacing overhead-costly wired communications and the tedious task of digging into and under pavement in urban and densely populated areas with wireless connectivity is not scalable.

The ability to transfer 100+ Gbps of data wirelessly will mitigate the use of broadband fiber optic channels in densely populated urban areas. In addition, mm-wave and sub-THz waves offer several advantages over microwave or optical signals. For example, contrary to microwave signals, mm-wave and sub-THz waves provide much higher bandwidths; and compared to optical links, mm-wave and sub-THz waves exhibit small attenuation in the presence of atmospheric disturbances, rain, or fog.

Although the availability of wide bandwidth (BW) at mm-wave and sub-THz frequencies obviously allows for higher data rate, it requires a broadband back-end signal processing and ultra-high sampling-rate mixed-signal unit that can process such broadband signals. If implemented in a conventional way, such back-end processing includes (de-)modulating broadband data. Increasing the modulation complexity to improve spectral efficiency and boost data rate instantly is a clear pathway for higher data rate transceivers. However, if done conventionally in the digital domain, it adds more complexity to the digital side and analog/digital interface, thereby making the design of this broadband system impractical, if not impossible.

A fully integrated 802.15.3c system operating in the 60 GHz mm-wave band achieved a 6.3 Gbps data rate even though 8 GHz of bandwidth is available. A bottleneck of such a system lies at the analog-digital interface. The transmitter (TX) part employs an integrated 3.4 GSa/s 8 bit DAC with 39 dBc SFDR on the same chip. The resolution and linearity of the DAC limited the complexity of modulation scheme and highest achievable baud-rate and thereby limit the data-rate.

An improved 60 GHz transceiver with a 28.16 Gbps data-rate over 8 GHz of bandwidth is also available. This work replaced the integrated DAC with a DAC inside a high-speed arbitrary waveform generator (AWG, Tektronix AWG70002A). Although the instrumentation level DACs perform much better than an integrated one, the cost associated with them is prohibitively high for commercial applications.

Another prior-work achieved 28 Gbps with 16QAM modulation but still requires a high-performance DAC (Keysight AWG M8195A) to be an essential part of the entire transmitter.

Prior high-speed transmitter works requiring no DACs suffer from low spectral efficiency and therefore can only achieve a much lower data-rate, e.g., 10 Gbps, 16 Gbps.

As such, conventional methods utilizing an expensive instrumentation level DAC can achieve a higher data-rate given the same bandwidth thanks to more spectrally efficient modulation schemes. However, the practicality of this approach is severely limited by the cost associated with those instrumentation level DACs. On the other hand, conventional methods that do not require such DACs can only employ spectrally inefficient modulation schemes due to the lack of a DAC and, thus, their data-rate is limited.

Through applied effort, ingenuity, and innovation, identified problems associated with the conventional methods described above have been solved by developing solutions that are included in embodiments of the present disclosure, many examples of which are described in detail herein.

SUMMARY

Multi-10 GHz of available bandwidth (BW) at low-THz bands contributes to a significant increase in communication BW. Orders of magnitude increases in BW in conjunction with higher-order modulation dramatically increase the data rate of a transmitter. The conventional realization of modulation in the back-end digital processing, however, mandates a practically impossible sampling rate and speed for the mixed-signal and the back-end unit.

The present embodiments resolve the above and other challenges by completely eliminating the need for a high-speed high-resolution DAC in the signal path while still generating $4^N$-QAM signal constellation with sufficient quality. The present transmitter architecture is comprised of N QPSK (quadrature phase shift keying) signal generators each with an amplitude of 2 k (k=1, 2 . . . N). Each QPSK signal generator can be realized as a I/Q up-conversion mixer driven by a saturating input power, or any other equivalent. The outputs of N QPSK signal generators are then combined linearly to produce the desired $4^N$-QAM signal.

The $4^N$-QAM signal generation does not involve any high-speed digital-to-analog conversion. Such approach makes the design of multi-10 Gbps wireless transmitter with $4^N$-QAM constellation a practical task. The present embodiments find wide applications in any wireless system that requires ultra-high data rate (>30 Gbps).

Other systems, devices, methods, features and advantages of the subject matter described herein will be or will become apparent to one with skill in the art upon examination of the following figures and detailed description. It is intended that all such additional systems, methods, features and advantages be included within this description, be within the scope of the subject matter described herein, and be protected by the accompanying claims. In no way should the features of the example embodiments be construed as limiting the appended claims, absent express recitation of those features in the claims.

BRIEF DESCRIPTION OF THE DRAWINGS

Figure 1A:
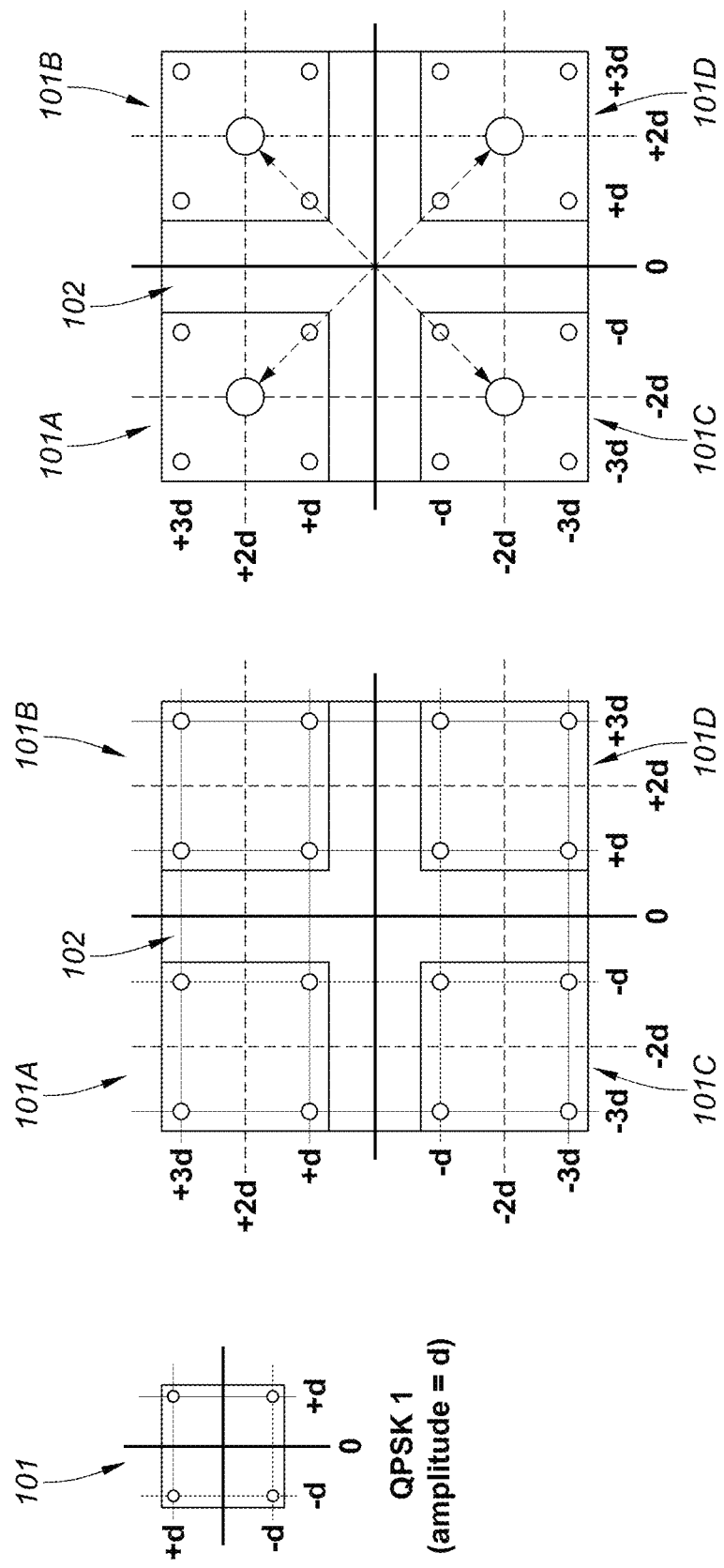
Figure 1B:
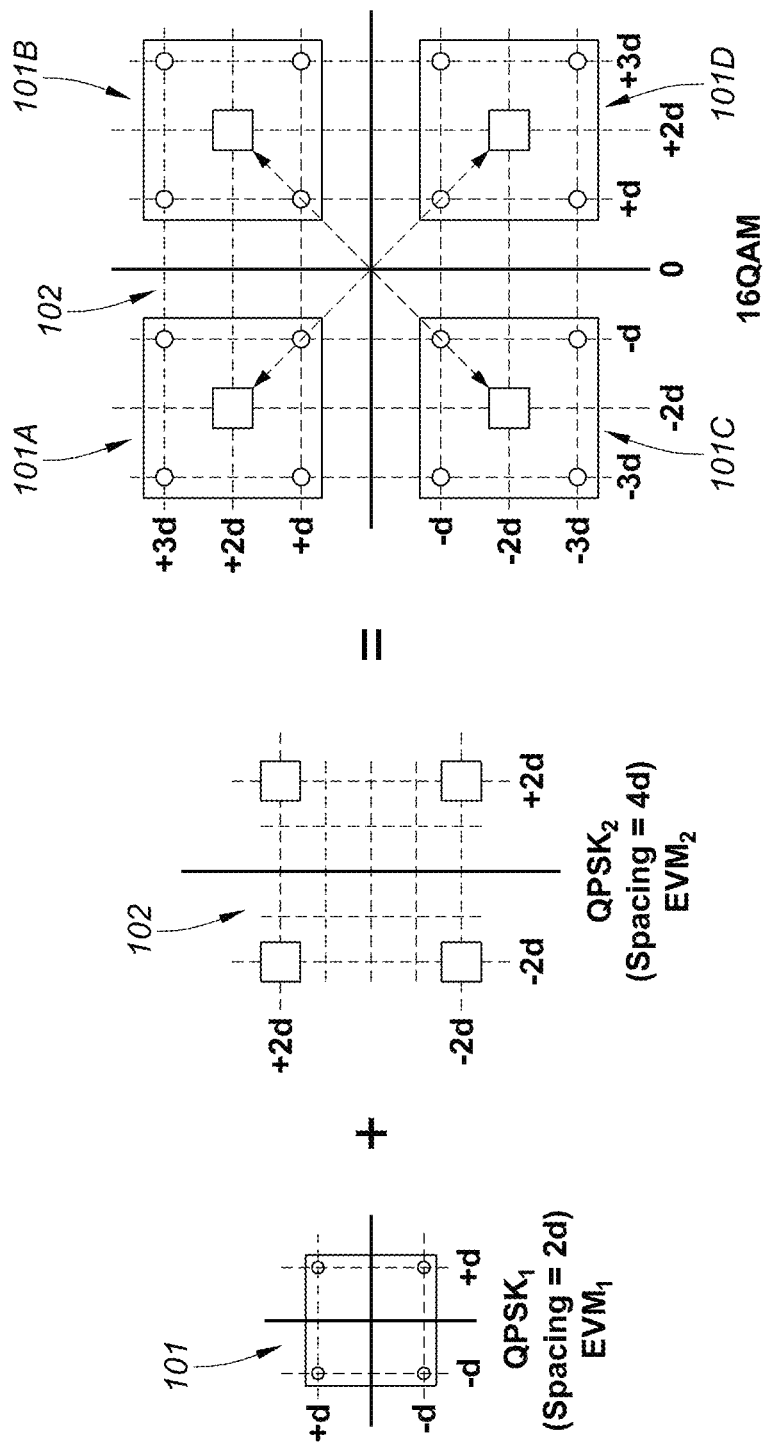
Figure 1C:
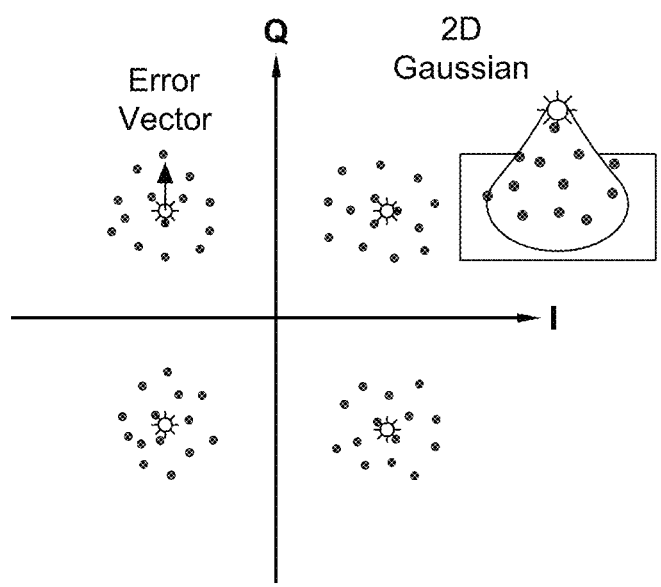
Figure 2:
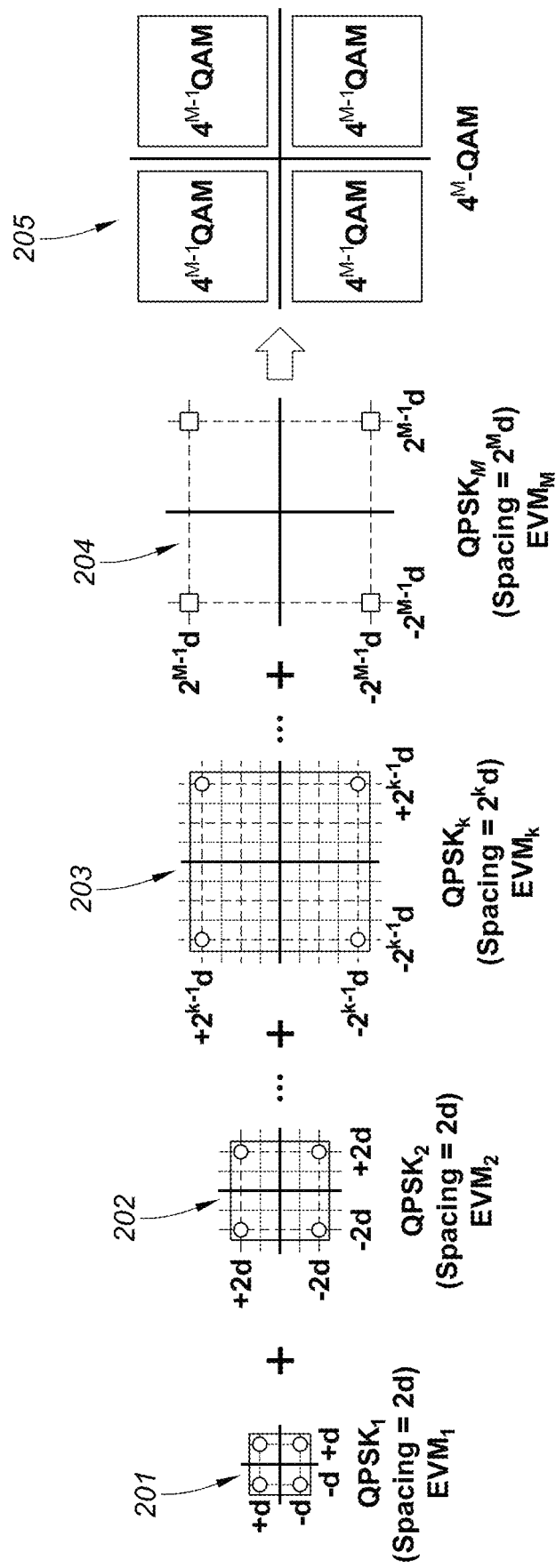
Figure 3A:
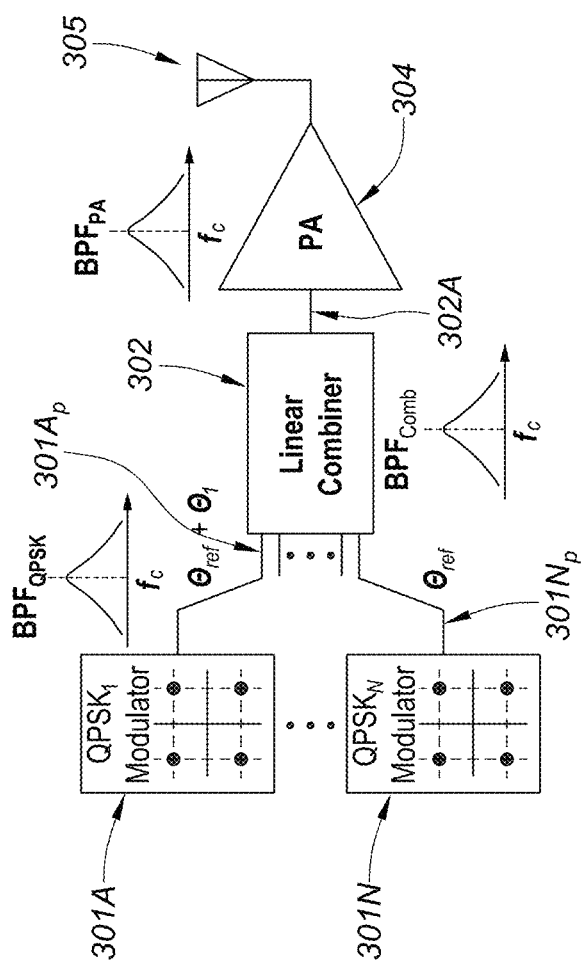
Figure 3B:
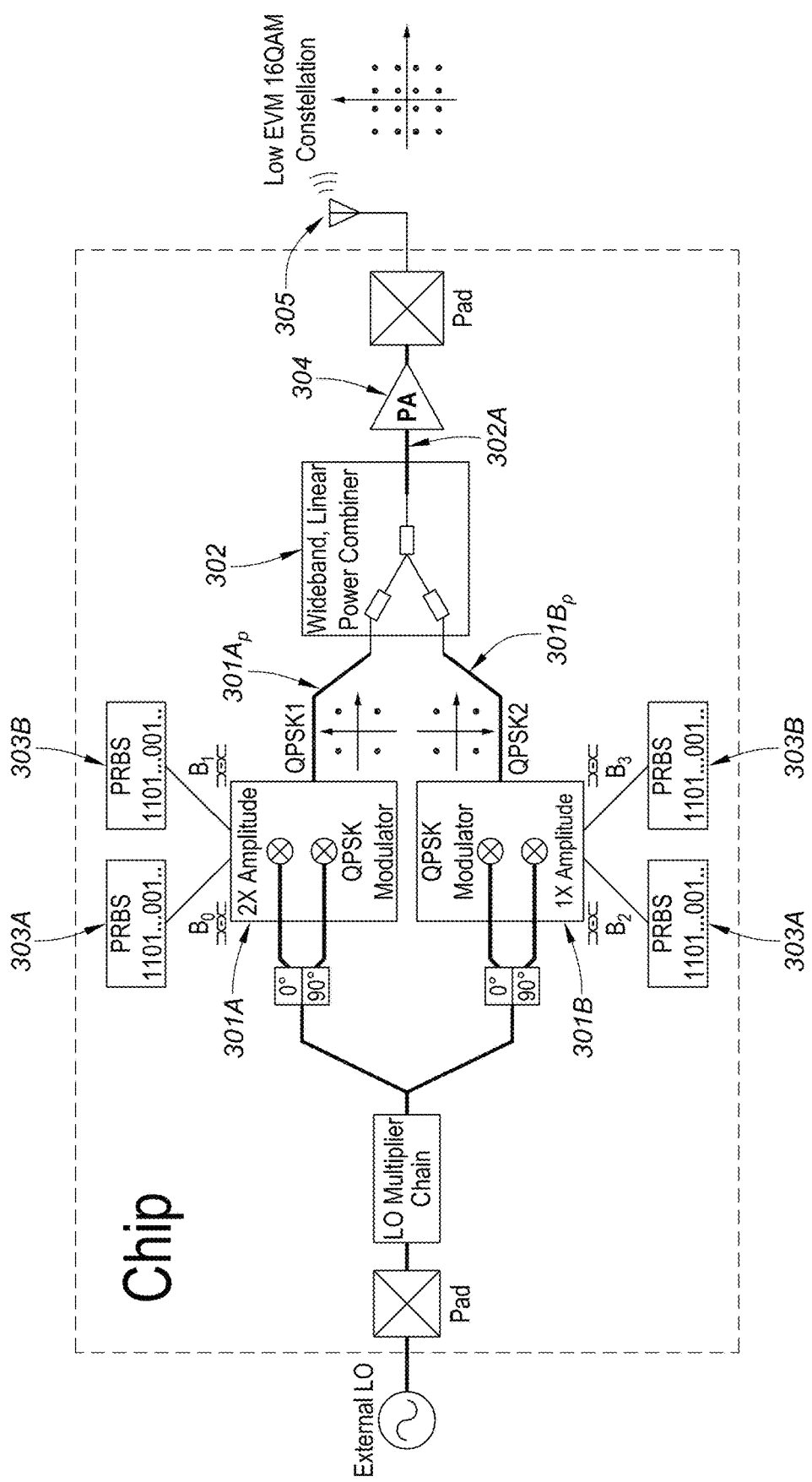
Figure 3C:
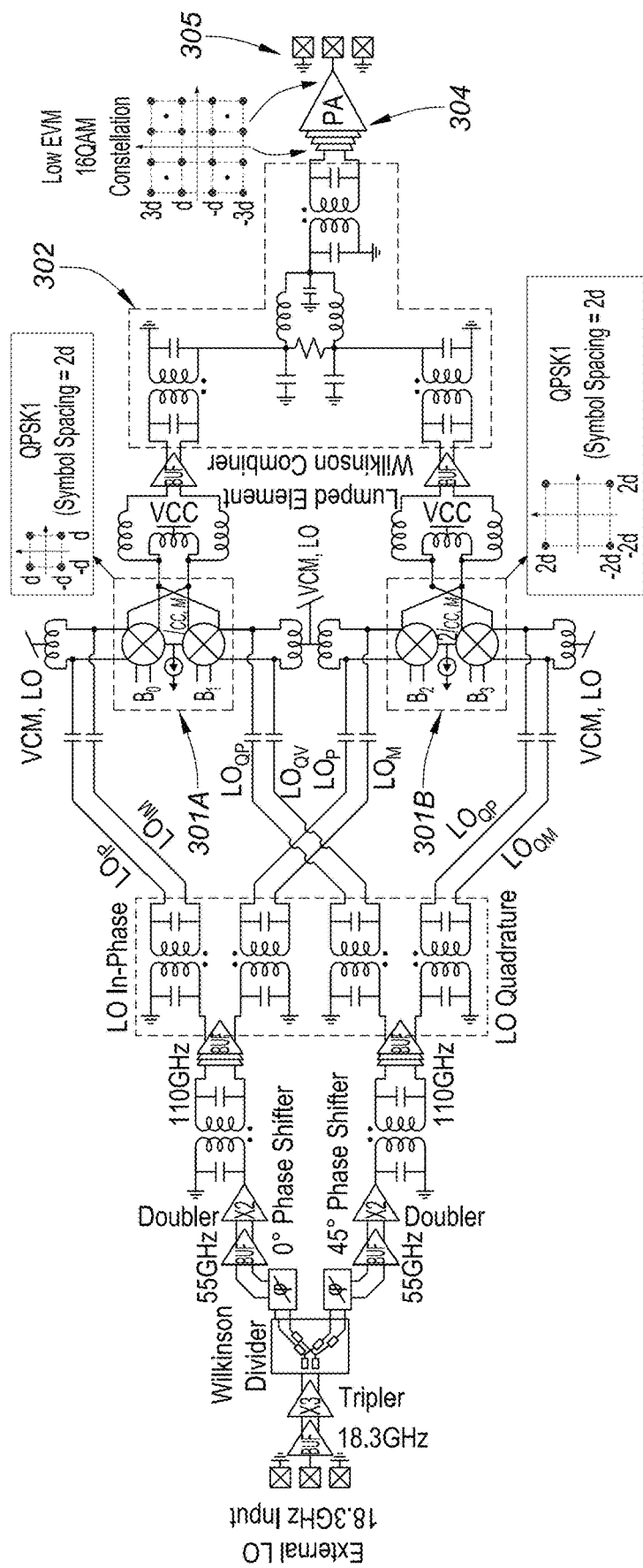
Figure 4B:
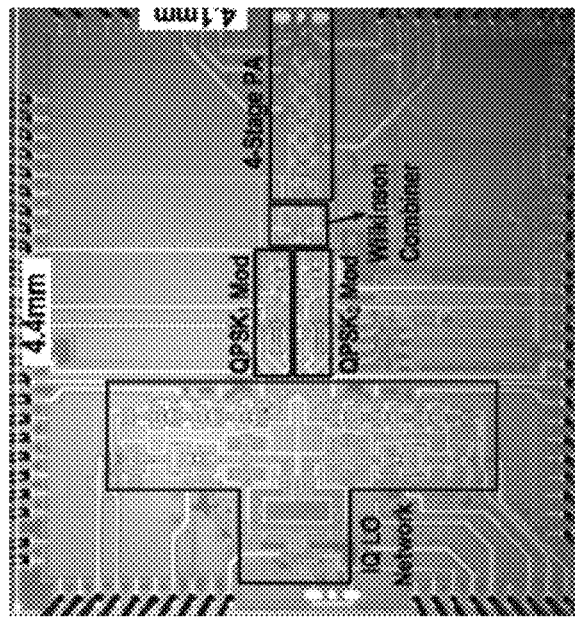
Figure 4A:
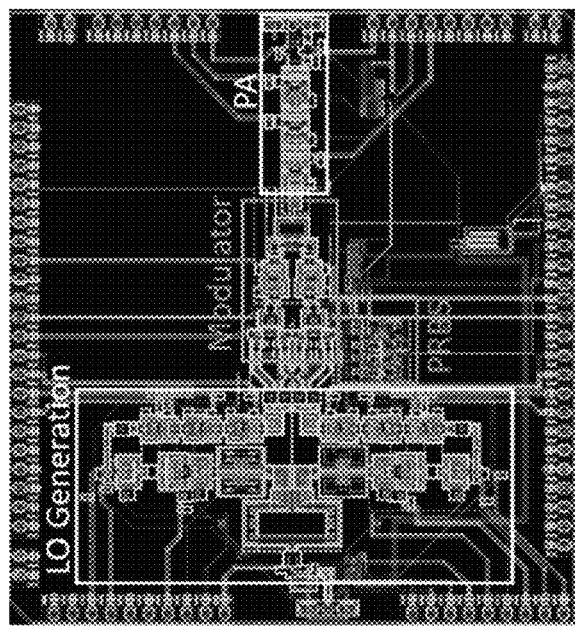
Figure 5:
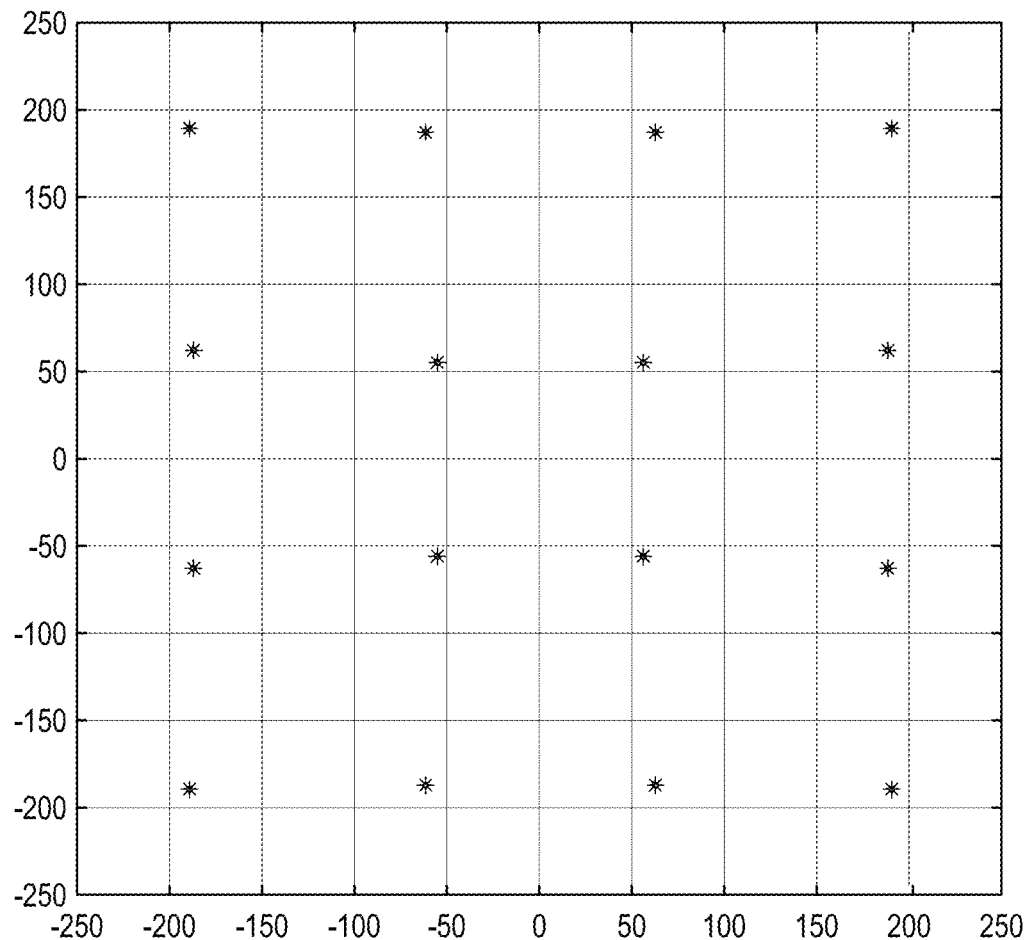
Figure 6A:
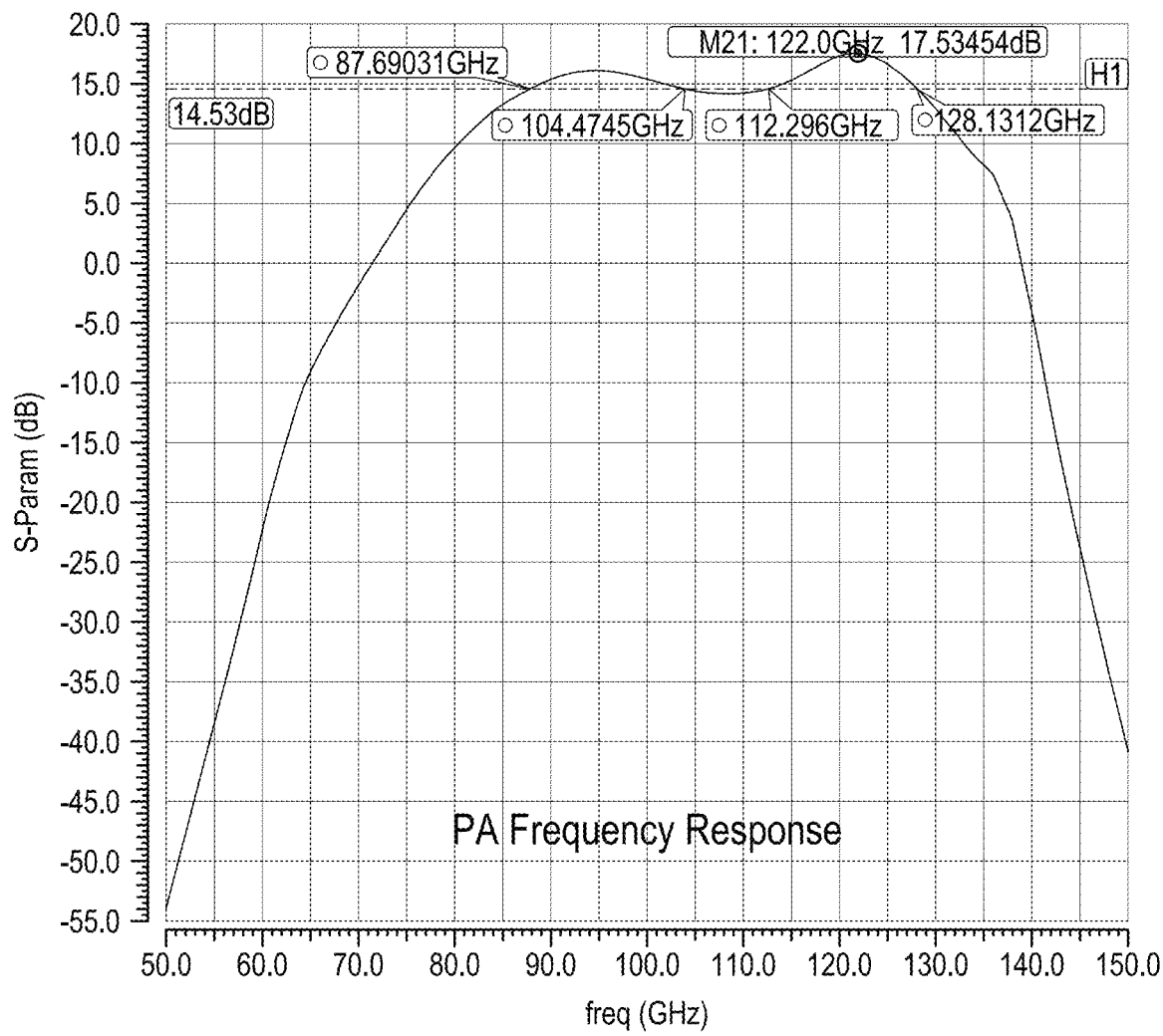
Figure 6B:
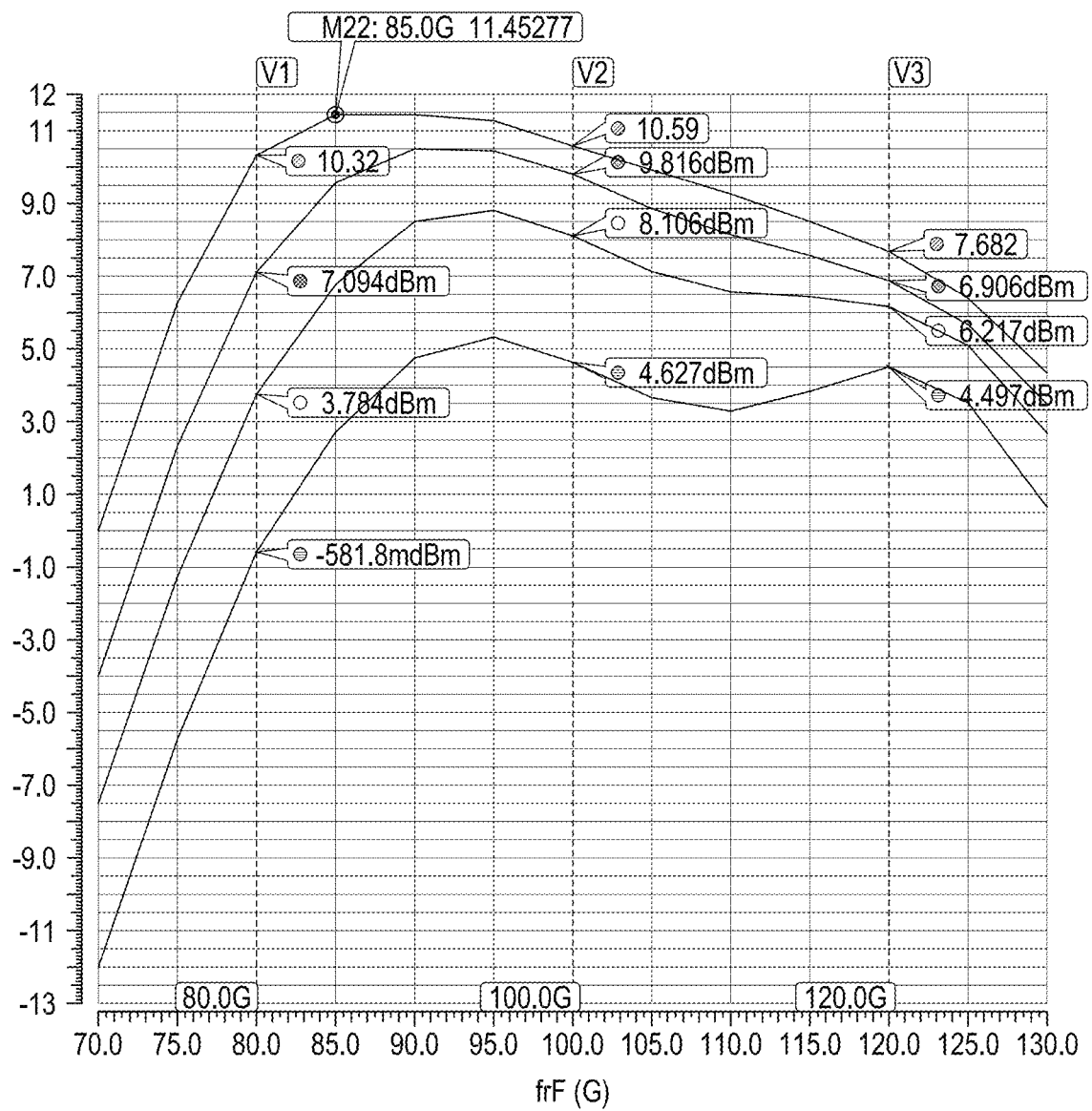

Having thus described the disclosure in general terms, reference will now be made to the accompanying drawings, which are not necessarily drawn to scale, and wherein:

FIGS. 1A and 1B illustrate an exemplary 16-QAM QPSK scheme for use with embodiments of the present disclosure;

FIG. 1C illustrates exemplary error distribution in each exemplary QPSK;

FIG. 2 illustrates an exemplary 64-QAM QPSK scheme and $4^M$-QAM QPSK scheme for use with embodiments of the present disclosure;

FIGS. 3A-3C illustrate exemplary bits-to-RF $4^M$-QAM transmitters according to embodiments of the present disclosure;

FIGS. 4A-4B illustrate exemplary prototypes of exemplary bits-to-RF $4^M$-QAM transmitters according to embodiments of the present disclosure;

FIG. 5 illustrates an output signal of an exemplary bits-to-RF transmitter according to embodiments of the present disclosure;

FIG. 6A illustrates PA simulation results for an exemplary bits-to-RF transmitter prototype disclosed herein; and FIG. 6B illustrates PA simulation results for an exemplary bits-to-RF transmitter prototype disclosed herein.

DETAILED DESCRIPTION

The present disclosure will now be described more fully hereinafter with reference to the accompanying drawings, in which some, but not all embodiments of the disclosure are shown. Indeed, the disclosure may be embodied in many different forms and should not be construed as limited to the embodiments set forth herein. Rather, these embodiments are provided so that this disclosure will satisfy applicable legal requirements. Like numbers refer to like elements throughout.

Quadrature amplitude modulation (QAM) refers to digital modulation methods and analog modulation methods used in modern telecommunications to transmit information. In general, QAM conveys two analog message signals, or two digital bit streams, by modulating the amplitudes of two carrier waves. QAM modulates the amplitudes by using an amplitude-shift keying (ASK) digital modulation scheme or an amplitude modulation (AM) analog modulation scheme. Under QAM, two carrier waves of the same frequency are out of phase with each other by 90°, which is referred to as orthogonality or quadrature. A transmitted signal is created by adding the two carrier waves together, and at the receiver, the two carrier waves of the received signal can be coherently separated (demodulated) because of their orthogonality.

Phase modulation (analog PM) and phase-shift keying (digital PSK) are special cases of QAM, where an amplitude of the transmitted signal is a constant, but its phase varies.

High-order, multi-10 GBaud QAM transmission has been studied primarily in the context of optical communications. The existing work has been traditionally using fully digital QAM (de)modulation schemes. The present disclosure is directed to (de)modulation in the analog domain—with the following contributions:

Reduced complexity of an analog (de)modulator and the mitigation of data conversion—whose resolution increases with modulation order;

An architecture that makes it the only possible pathway for ultra-high data-rate mm-wave wireless systems where power consumption is a much more critical concern as compared to the optical communication counterparts;

QAM demodulation independent of fine gain tuning;

The results of implementations of the present disclosure are readily applicable to any square QAM constellation; and Receive signal strength indication (RSSI) measurement is also accomplished as a by-product of the present disclosure.

QPSK modulation, the simplest form of a QAM scheme, is amenable to analog implementation at ultra-high data rates. The present disclosure constructs the higher order QAM modulations using a QPSK scheme with easily realizable operations.

FIGS. 1A and 1B illustrate an exemplary 16-QAM QPSK scheme for use with embodiments of the present disclosure. Starting with a simpler form of $4^N$-QAM, e.g., 16-QAM, a modular approach is explored in generating this constellation from a QPSK. At first glance, a 16-QAM scheme is clearly comprised of 4 QPSK constellations across 4 quadrants of the I-Q plane. An alternative perspective is to consider one QPSK (101), which is replicated around four distinct origins in 4 quadrants (e.g., shown as 101A, 101B, 101C, 101C in FIG. 1A). This means that, in order to generate a 16-QAM constellation, only 2 QPSKs are needed: QPSK1 (101) with a symbol spacing of 2d and QPSK2 (102) with 4d symbol spacing. QPSK2 (102) is responsible for transferring the (0, 0) origin to four origins (shown in FIG. 1A) located at (−2d, −2d), (−2d,+2d), (2d, −2d), (2d, 2d). A Cartesian vector summation of QPSK1 (101) symbols with those of QPSK2 (102) (shown in FIG. 1B) in the I-Q plane will readily generate four new random symbols around each new reference in each quadrant, thereby resulting in 16-QAM modulation (also shown in FIG. 1B). FIG. 1C illustrates exemplary error distribution in each exemplary QPSK.

FIG. 2 illustrates an exemplary 64-QAM QPSK scheme and $4^M$-QAM QPSK scheme for use with embodiments of the present disclosure. Similar to that of FIGS. 1A and 1B, a 64-QAM constellation is directly generated by replicating a 16-QAM (201) across four quadrants and around 4 origins generated by another QPSK scheme with symbol spacing 8d (shown in FIG. 2 202). That is, QPSK3 (202) is used to generate a 16-QAM scheme (201), which is then replicated across four quadrants to construct a 64-QAM QPSK scheme (203, comprising 201A, 201B, 201C, 201D).

To construct higher order $4^N$-QAM schemes, the present disclosure employs N QPSKs with symbol spacing of 2 Kd (k=1, N). Once N QPSK patterns are generated with N 2-bit PRBS (pseudo-random binary sequence) streams in the analog domain, this iterative procedure only requires scaling and vector summation, as easily implemented in analog (or RF) domain.

By way of illustrative example, the following section describes a detailed transmitter architecture with 16-QAM modulation using the present method. It will be appreciated that this method can be applied to any $4^N$-QAM modulation with N starting from 1.

FIGS. 3A-3C illustrate an exemplary bits-to-RF 16-QAM transmitter 300 or $4^M$-QAM transmitter according to embodiments of the present disclosure. The exemplary 16-QAM modulation is constructed from two QPSK modulator branches 301A, 301B, each implemented by direct conversion IQ mixers. Driven by two independent two-bit PRBS streams (303A, 303B, 303C, 303D, respectively), these QPSK modulators 301A, 301B employ internal gain controls so as to create desired symbol spacing of 2d and 4d (e.g., as discussed with respect to FIGS. 1A-1B). A 2-to-1 differential power combiner 302 at the output of QPSK modulators 301A, 301B combines the weighted QPSK signals and produces a 16-QAM signal 302A. The port-to-port isolation provided by the power combiner 302 (e.g., Wilkinson or equivalent) ensures minimal interaction between the two QPSK paths $301A_p$, $301B_p$, and minimizes the error-vector-magnitude (EVM) degradation due to cross-talk. Finally, a power amplifier (PA) 304 delivers enough power to the antenna 305 to establish a wireless link.

FIGS. 4A and 4B illustrate an exemplary prototype of an exemplary bits-to-RF 16-QAM transmitter according to embodiments of the present disclosure. A prototype of the exemplary transmitter of FIGS. 3A-3C has been fabricated in a SiGe BiCMOS IC process with the layout shown in FIG. 4A. A prototype of the exemplary transmitter of FIGS. 3A-3C has been fabricated with the layout shown in FIG. 4B.

FIG. 5 illustrates an output signal of an exemplary bits-to-RF transmitter according to embodiments of the present disclosure. In FIG. 5, the output signal after combining two QPSK modulator signals is analyzed to produce the 16-QAM constellation estimation. After proper gain matching of two QPSK signals, the desired 16-QAM constellation is generated with sufficient quality. The exemplary prototype operates around 108 GHz center frequency with 40 GHz RF bandwidth and can potentially support at least 60 Gbps of data rate wirelessly.

FIGS. 6A and 6B illustrate PA simulation results for an exemplary bits-to-RF transmitter prototype disclosed herein. The saturated output power of the PA is +10 dBm. With 6 dB back-off for reasonable linearity, the PA can potentially deliver +4 dBm 16QAM modulated signal with 60 Gbps data-rate.

Embodiments of the present disclosure are directed to a wireless transmitter, comprising a plurality of PRBS streams, where each PRBS stream of the plurality of PRBS streams drives a different QPSK modulator branch of a plurality of QPSK modulator branches of the wireless transmitter, a differential power combiner electrically coupled to outputs of each QPSK modulator branch of the plurality of QPSK modulator branches, and a power amplifier electrically coupled to an output of the differential power combiner.

In embodiments, in the wireless transmitter, each QPSK modulator branch comprises a direct conversion IQ mixer.

In embodiments, in the wireless transmitter, each QPSK modulator branch employs internal gain controls so as to create desired symbol spacing.

In embodiments, in the wireless transmitter, the desired symbol spacing is one or more of 2d or 4d.

In embodiments, in the wireless transmitter, the power amplifier combines weighted output signals from the plurality of QPSK modulator branches to produce an N-QAM signal.

In embodiments, in the wireless transmitter, the power amplifier combines weighted output signals from the plurality of QPSK modulator branches to produce a $4^N$-QAM signal.

In embodiments, in the wireless transmitter, the power amplifier delivers a power signal to an antenna to establish a wireless communication link.

In embodiments, in the wireless transmitter, the differential power combiner provides port-to-port isolation.

In embodiments, in the wireless transmitter, the port-to-port isolation ensures minimal interaction between paths of the QPSK modulators.

In embodiments, in the wireless transmitter, the port-to-port isolation minimizes error-vector-magnitude (EVM) cross-talk.

Embodiments of the present disclosure are directed to a method of producing a $4^N$-QAM signal, comprising driving each QPSK modulator branch of a plurality of QPSK modulator branches using a different PRBS stream of a plurality of PRBS streams, electrically coupling a differential power combiner to outputs of each QPSK modulator branch of the plurality of QPSK modulator branches, and electrically coupling a power amplifier to an output of the differential power combiner, where the power amplifier combines weighted output signals from the plurality of QPSK modulator branches to produce a $4^N$-QAM signal.

In embodiments, in the method of producing the $4^N$-QAM signal, each QPSK modulator branch comprises a direct conversion IQ mixer.

In embodiments, the method of producing the $4^N$-QAM signal further comprises creating desired symbol spacing by employing, by each QPSK modulator branch, internal gain controls.

In embodiments, in the method of producing the $4^N$-QAM signal, the desired symbol spacing is one or more of 2d or 4d.

In embodiments, the method of producing the $4^N$-QAM signal further comprises establishing a wireless communication link with an antenna by delivering, by the power amplifier, a power signal to an antenna.

In embodiments, in the method of producing the $4^N$-QAM signal, the differential power combiner provides port-to-port isolation.

In embodiments, in the method of producing the $4^N$-QAM signal, the port-to-port isolation ensures minimal interaction between paths of the QPSK modulators.

In embodiments, in the method of producing the $4^N$-QAM signal, the port-to-port isolation minimizes error-vector-magnitude (EVM) cross-talk.

CONCLUSION

One or more of the components, processes, features, and/or functions illustrated in the figures may be rearranged and/or combined into a single component, block, feature or function or embodied in several components, steps, or functions. Additional elements, components, processes, and/or functions may also be added without departing from the disclosure. The apparatus, devices, and/or components illustrated in the Figures may be configured to perform one or more of the methods, features, or processes described in the Figures. The algorithms described herein may also be efficiently implemented in software and/or embedded in hardware.

Note that the aspects of the present disclosure may be described herein as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

Those of skill in the art would further appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and processes have been described above generally in terms of their functionality. Whether such functionality is implemented as hardware or software depends upon the particular application and design constraints imposed on the overall system.

The enablements described above are considered novel over the prior art and are considered critical to the operation of at least one aspect of the disclosure and to the achievement of the above described objectives. The words used in this specification to describe the instant embodiments are to be understood not only in the sense of their commonly defined meanings, but to include by special definition in this specification: structure, material or acts beyond the scope of the commonly defined meanings. Thus, if an element can be understood in the context of this specification as including more than one meaning, then its use must be understood as being generic to all possible meanings supported by the specification and by the word or words describing the element.

The definitions of the words or drawing elements described above are meant to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements described and its various embodiments or that a single element may be substituted for two or more elements in a claim.

Changes from the claimed subject matter as viewed by a person with ordinary skill in the art, now known or later devised, are expressly contemplated as being equivalents within the scope intended and its various embodiments. Therefore, obvious substitutions now or later known to one with ordinary skill in the art are defined to be within the scope of the defined elements. This disclosure is thus meant to be understood to include what is specifically illustrated and described above, what is conceptually equivalent, what can be obviously substituted, and also what incorporates the essential ideas.

In the foregoing description and in the figures, like elements are identified with like reference numerals. The use of "e.g.," "etc.," and "or" indicates non-exclusive alternatives without limitation, unless otherwise noted. The use of "including" or "includes" means "including, but not limited to," or "includes, but not limited to," unless otherwise noted.

As used above, the term "and/or" placed between a first entity and a second entity means one of (1) the first entity, (2) the second entity, and (3) the first entity and the second entity. Multiple entities listed with "and/or" should be construed in the same manner, i.e., "one or more" of the entities so conjoined. Other entities may optionally be present other than the entities specifically identified by the "and/or" clause, whether related or unrelated to those entities specifically identified. Thus, as a non-limiting example, a reference to "A and/or B", when used in conjunction with open-ended language such as "comprising" can refer, in one embodiment, to A only (optionally including entities other than B); in another embodiment, to B only (optionally including entities other than A); in yet another embodiment, to both A and B (optionally including other entities). These entities may refer to elements, actions, structures, processes, operations, values, and the like.

Many modifications and other embodiments of the inventions set forth herein will come to mind to one skilled in the art to which these inventions pertain having the benefit of the teachings presented in the foregoing description and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation, unless described otherwise.

The invention claimed is:

1. A wireless transmitter, comprising:
   a plurality of PRBS streams, wherein each PRBS stream of the plurality of PRBS streams drives a different QPSK modulator branch of a plurality of QPSK modulator branches of the wireless transmitter;
   a differential power combiner electrically coupled to outputs of each QPSK modulator branch of the plurality of QPSK modulator branches; and
   a power amplifier electrically coupled to an output of the differential power combiner.

2. The wireless transmitter of claim 1, wherein each QPSK modulator branch comprises a direct conversion IQ mixer.

3. The wireless transmitter of claim 1, wherein each QPSK modulator branch is configured to create desired symbol spacing by employing internal gain control.

4. The wireless transmitter of claim 3, wherein the desired symbol spacing comprises one or more of 2d or 4d.

5. The wireless transmitter of claim 1, wherein the power amplifier is configured to produce an N-QAM signal by combining weighted output signals from the plurality of QPSK modulator branches.

6. The wireless transmitter of claim 5, wherein the power amplifier is configured to produce a $4^N$-QAM signal by combining weighted output signals from the plurality of QPSK modulator branches.

7. The wireless transmitter of claim 1, wherein the power amplifier is configured to deliver a power signal to an antenna to establish a wireless communication link.

8. The wireless transmitter of claim 1, wherein the differential power combiner is configured to provide port-to-port isolation.

9. The wireless transmitter of claim 8, wherein the port-to-port isolation is configured to minimize interaction between paths of the QPSK modulators.

10. The wireless transmitter of claim 8, wherein the port-to-port isolation is configured to minimize error-vector-magnitude (EVM) cross-talk.

11. A method of producing a $4^N$-QAM signal, comprising:
driving each QPSK modulator branch of a plurality of QPSK modulator branches using a different PRBS stream of a plurality of PRBS streams;
electrically coupling a differential power combiner to outputs of each QPSK modulator branch of the plurality of QPSK modulator branches; and
electrically coupling a power amplifier to an output of the differential power combiner, wherein the power amplifier combines weighted output signals from the plurality of QPSK modulator branches to produce a $4^N$-QAM signal.

12. The method of claim 11, wherein each QPSK modulator branch comprises a direct conversion IQ mixer.

13. The method of claim 11, further comprising:
creating desired symbol spacing by employing, in each QPSK modulator branch, internal gain control.

14. The method of claim 13, wherein the desired symbol spacing comprises one or more of 2d or 4d.

15. The method claim 11, further comprising:
establishing a wireless communication link with an antenna by delivering, using the power amplifier, a power signal to an antenna.

16. The method of claim 11, wherein the differential power combiner is configured to provide port-to-port isolation.

17. The method of claim 16, wherein the port-to-port isolation is configured to minimize interaction between paths of the QPSK modulators.

18. The method of claim 16, wherein the port-to-port isolation is configured to minimize error-vector-magnitude (EVM) cross-talk.

* * * * *